United States Patent
Yaldo et al.

(10) Patent No.: US 10,399,507 B1
(45) Date of Patent: Sep. 3, 2019

(54) MIRROR SYSTEM FOR VEHICLE INTERIORS

(71) Applicant: GM GLOBAL TECHNOLOGY OPERATIONS LLC, Detroit, MI (US)

(72) Inventors: Rawaa Yaldo, West Bloomfield, MI (US); Valor Yaldo, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 47 days.

(21) Appl. No.: 15/895,065

(22) Filed: Feb. 13, 2018

(51) Int. Cl.
| | |
|---|---|
| *B60R 99/00* | (2009.01) |
| *B60R 11/00* | (2006.01) |
| *B60R 1/00* | (2006.01) |
| *B60N 2/01* | (2006.01) |
| *G02B 7/182* | (2006.01) |

(52) U.S. Cl.
CPC ............... *B60R 11/00* (2013.01); *B60N 2/01* (2013.01); *B60R 1/00* (2013.01); *G02B 7/182* (2013.01); *B60R 2011/007* (2013.01); *B60R 2011/008* (2013.01); *B60R 2011/0028* (2013.01); *B60R 2011/0071* (2013.01)

(58) Field of Classification Search
CPC ... B60R 11/00; B60R 1/00; B60R 2011/0028; B60R 2011/007; B60R 2011/0071; B60R 2011/008; B60N 2/01; G02B 7/182
See application file for complete search history.

(56) References Cited

U.S. PATENT DOCUMENTS

| | | | |
|---|---|---|---|
| 2008/0247837 A1* | 10/2008 | Cardona | A61G 3/0808 410/23 |
| 2014/0265753 A1* | 9/2014 | Soper | A47B 21/06 312/22 |
| 2018/0319340 A1* | 11/2018 | An | B60R 1/12 |
| 2019/0118678 A1* | 4/2019 | Stevens | B60N 2/2209 |

* cited by examiner

*Primary Examiner* — Lori L Lyjak

(57) ABSTRACT

One general aspect includes a mirror system including: a retractor module configured to be installed onto the ceiling of a vehicle interior; a retractor assembly positioned within the retractor module, the retractor assembly having a retractable connector attached at one end to a mirror positioned outside of the retractor module, the retractor assembly configured to releasably maintain the connector in a retracted position and at least one extended position; and the mirror being pivotably connected to the connector around a horizontal axis such that the mirror can be in a substantially horizontal orientation and substantially vertical orientation.

20 Claims, 5 Drawing Sheets

MIRROR SYSTEM FOR VEHICLE INTERIORS

INTRODUCTION

The interiors of vehicle, such as autonomous vehicles, may have seating configurations in which all passengers face towards the interior's center. This round table seating configuration is useful when passengers desire to converse with each other. However, it also comes with drawbacks. For example, interior mirrors of known configurations may not be available to at least one passenger. Therefore, it is desirable for such interiors to provide a mirror system which is accessible to each of the passengers. Furthermore, other desirable features and characteristics will become apparent from the subsequent detailed description of exemplary embodiments and the appended claims, taken in conjunction with the accompanying drawings.

SUMMARY

One general aspect includes a mirror system including: a retractor module configured to be installed onto the ceiling of a vehicle interior; a retractor assembly positioned within the retractor module, the retractor assembly having a retractable connector attached at one end to a mirror positioned outside of the retractor module, the retractor assembly configured to releasably maintain the connector in a retracted position and at least one extended position; and the mirror being pivotably connected to the connector around a horizontal axis such that the mirror can be in a substantially horizontal orientation or substantially vertical orientation.

Implementations may include one or more of the following features. The mirror system where, when in the substantially horizontal orientation, the mirror can releasably affix to the exterior of the retractor module via a snap clip. The mirror system where, when in the substantially horizontal orientation, the mirror can releasably affix to the exterior of the retractor module via a magnet. The mirror system where the retractor assembly is rotatably positioned within the retractor module such that the mirror can rotate 360 degrees around a vertical axis. The mirror system where the vehicle interior is located in an autonomous vehicle and has by two rows of vehicle seats, where each vehicle seat row can face the other vehicle seat row. The mirror system where the retractable connector is a strip of fabric webbing. The mirror system where the mirror is pivotably connected to the connector via an axle hinge. The mirror system where the mirror is a two-sided mirror.

One general aspect includes an vehicle interior including: a retractor assembly affixed to the ceiling of the vehicle interior, the retractor assembly having a retractable connector attached at one end to a mirror, the retractor assembly configured to releasably maintain the connector in a retracted position and at least one extended position; and the mirror being pivotably connected to the connector around a horizontal axis such that the mirror can be in a substantially horizontal orientation and substantially vertical orientation.

Implementations may include one or more of the following features. The vehicle interior where, when in the substantially horizontal orientation, the mirror can releasably affix to the ceiling of the vehicle interior via a snap clip. The vehicle interior where, when in the substantially horizontal orientation, the mirror can releasably affix to the ceiling of the vehicle interior via a magnet. The vehicle interior where the retractor assembly is rotatably affixed ceiling of the vehicle interior such that the mirror can rotate 360 degrees around a vertical axis. The vehicle interior where the vehicle interior in located in an autonomous vehicle and includes two rows of vehicle seats, where each vehicle seat row can face the other vehicle seat row. The vehicle interior where the retractable connector is a strip of fabric webbing. The vehicle interior where the retractable connector is a steel cord. The vehicle interior where the mirror is pivotably connected to the connector via an axle hinge. The vehicle interior where the mirror is a two-sided mirror.

One general aspect includes an autonomous vehicle interior including: two rows of vehicle seats, where each vehicle seat can face towards a central location in the vehicle interior. The autonomous vehicle interior also includes a retractor assembly rotatably affixed to the vehicle interior ceiling and at a ceiling location generally centered between the vehicle seats, the retractor assembly having a retractable connector attached at one end to a two-sided mirror, the retractor assembly configured to releasably maintain the connector in a retracted position and at least one extended position; and the mirror being rotatably connected to the connector around a horizontal axis via an axle hinge such that the mirror can be in one of a substantially horizontal orientation, tilted orientation, or substantially vertical orientation, where, when in the substantially horizontal orientation, the mirror can releasably affix to the ceiling of the vehicle interior via a snap clip and, when in the tilted orientation or substantially vertical orientation, the mirror can rotate 360 degrees around a vertical axis via the retractor assembly.

Implementations may include one or more of the following features. The autonomous vehicle interior where the mirror is detachable from the connector. The autonomous vehicle interior where the retractable connector is a steel cord.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
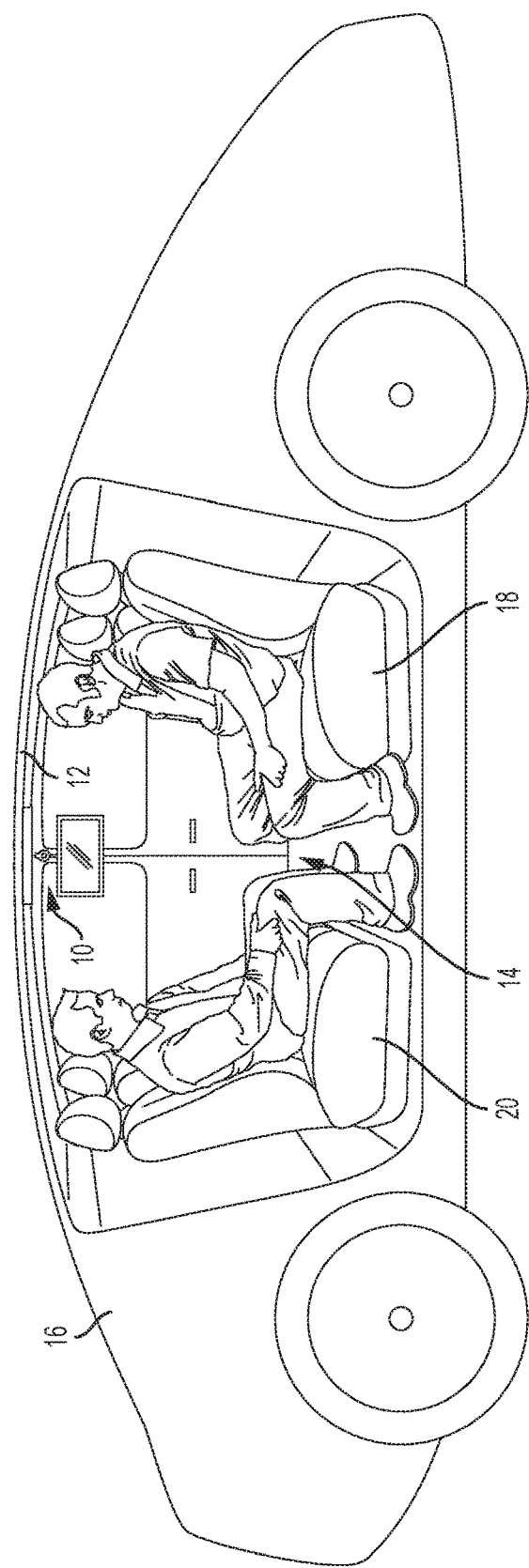
FIG. 1 shows an environmental view of an exemplary mirror system according to an aspect of the present disclosure.

As can be seen in FIG. 1, a mirror system that incorporates a retractable mirror within the interior of an autonomous vehicle has been generally indicated by reference number 10. Under normal circumstances, mirror system 10 is adapted to be installed at a generally central location on the ceiling 12 of the interior 14 of the autonomous vehicle 16. As known for certain types of autonomous vehicles 16, this ceiling location may be positioned between two rows of vehicle seats that face each other, a front row 18 and a back row 20. In many instances, these seats can be rotatable around a vertical axis (not shown) to allow each seat to face directly towards another seat being in the opposite row or towards a central location in the vehicle's interior 14. Skilled artisans generally know this kind of vehicle seat orientation as a "round table" seating.

Figure 2:
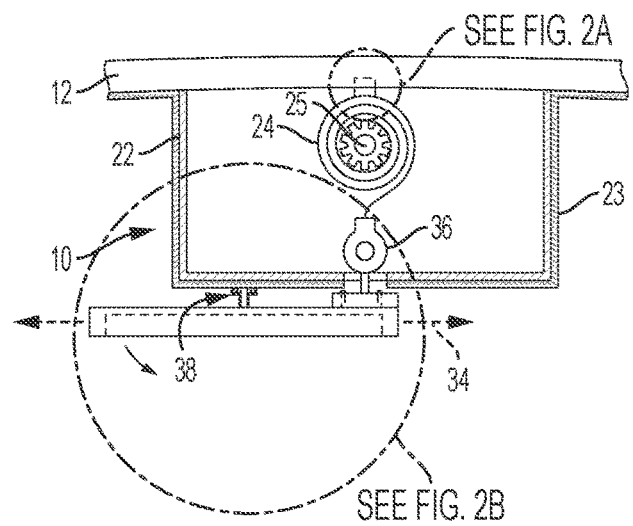
FIG. 2 shows a side view of an exemplary mirror system according to an aspect of the present disclosure.

As can be seen in FIG. 2, one embodiment of mirror system 10 includes a retractor module 22 that is installed onto ceiling 12, at the above discussed center location. Retractor module 22 is a housing which generally encapsulates and conceals the unsightly mechanical features of mirror system 10 such as, for instance, the retractor assembly 24 (discussed below). A layer of upholstery 23 can also be affixed to the underside of module 22 to conceal the module itself and provide an appearance that system's mirror feature retracts directly from ceiling 12. In other embodiments, it has been envisioned, mirror system 10 does not incorporate a retractor module 22 (see FIG. 1), or this module is positioned at some other location (e.g., at some location in the frame of the vehicle) while allowing the mirror to generally extend/retract from the center of ceiling 12.

Retractor assembly 24 is operatively positioned within module 22 and is similar to seat belt retractor assemblies generally used in vehicle seatbelt systems. As such, retractor assembly 24 includes an internal spool 25 that is rotatable to wind a connector 26. The spool 25 is biased, moreover, such as by a spring (not shown) mounted within retractor assembly 24, to wind a portion of the connector 26 around the spool 25. Retractor assembly 24 additionally includes a ratchet wheel and pawl (not shown) by which the rotation of the retractor spool 25 may be locked in place under certain circumstances such as when in one or more extender positions.

Figure 2A:
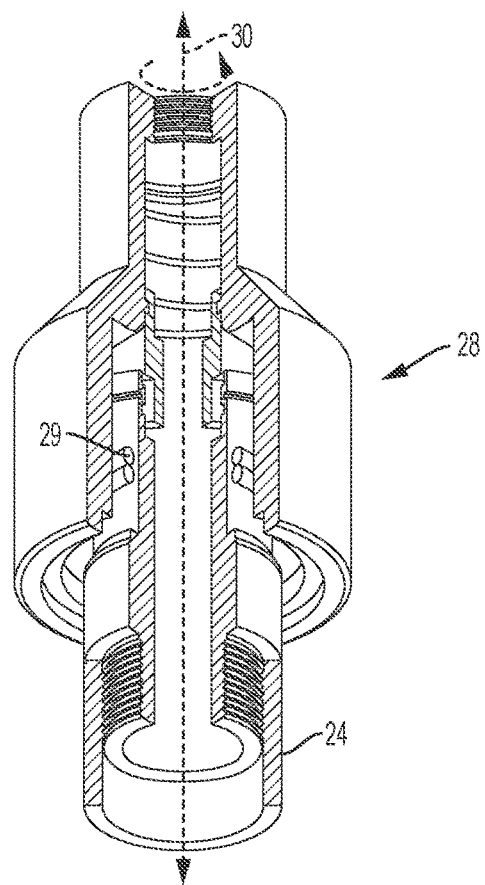
FIG. 2A shows an exemplary rotary coupling feature of the exemplary mirror system of FIG. 2.

In one or more embodiments, retractor assembly 24 is rotatably coupled to ceiling 12 or within module 22 by means of a rotary union 28 (otherwise known as a rotary coupling). With reference to FIG. 2A, the roller bearing feature 29 of rotary union 28 enables retractor assembly 24 to rotate 360 degrees around a vertical axis 30 with ease. It has also been envisioned that one or more brakes can be incorporated into rotary union 28 to restrict the rotation of retractor assembly 24 to something less than 360 degrees. Skilled artisans would also see the independent shaft and housing components of rotary union 28 will also help to allow for the continuous rotation of rotary assembly 24 around vertical axis 30.

Figure 2B:
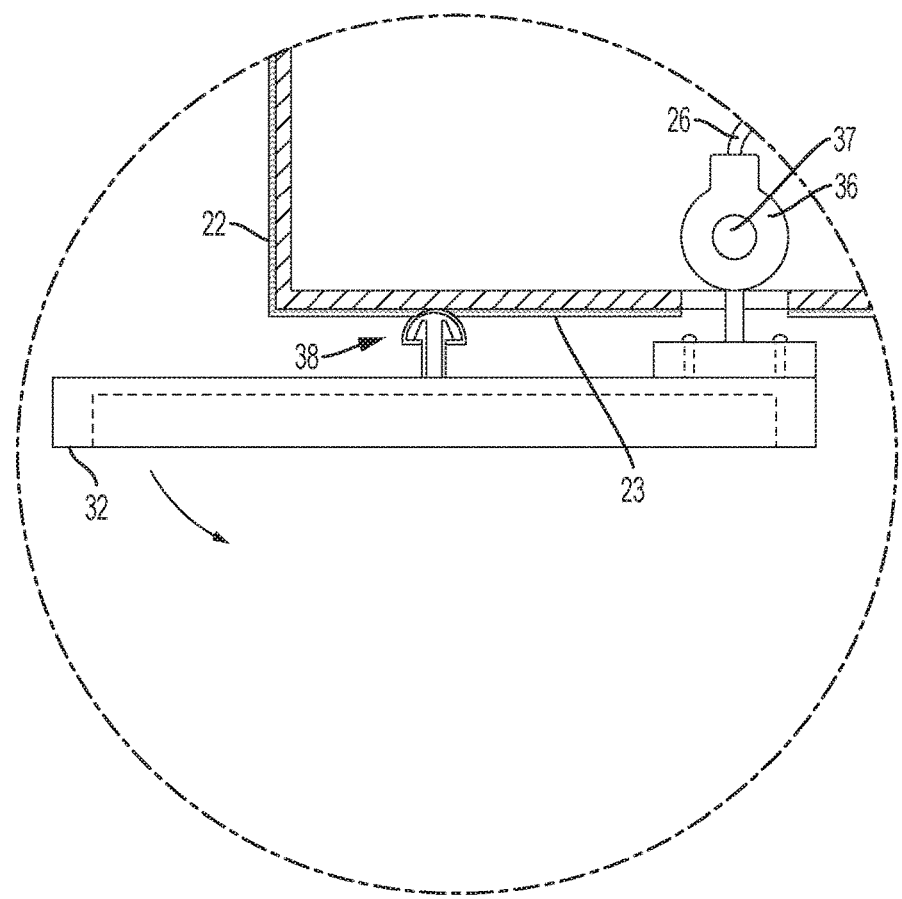
FIG. 2B shows a an exemplary pivotable coupling feature and mirror assembly of the mirror system of FIG. 2 according to an aspect of the present disclosure.

A mirror assembly 32 is joined to the free end of connector 26. As shown, in this embodiment, mirror assembly 32 is positioned entirely outside of retractor module 22 and can dangle below the module via the connector 26, which protrudes through an opening at, for example, centrally of module 22. With reference to FIG. 2B, mirror assembly 32 is pivotably joined to connector 26 around a horizontal axis 34 by means of an axle hinge 36. As such, axle hinge allows mirror assembly 32 to swing downwardly from a horizontal orientation, which is substantially parallel with ceiling 12, to a vertical orientation, which generally conforms to vertical axis 30, or one or more titled orientations, all which may be somewhere between 30 and 60 degrees relative to vertical axis 30. What is more, one part of axle hinge 36 is pinched to the end of connector 26 and the other part is joined to one side of mirror assembly 32 (e.g., via screws/bolts). An axle 37 (or pin) can be inserted through both hinge parts to operatively connect connector 26 to mirror assembly 32. One or more stops may also be incorporated into axle hinge 36 to help establish the one or more tilted orientations. Skilled artisans will see that other embodiments of mirror system 10 may include pivotable joining devices other than an axle hinge (e.g., a cam lift hinge, spring hinge, overlay hinge, etc.).

When placed in the horizontal orientation, mirror assembly 32 can releasably affix to the exterior of module 22 or ceiling 12 by means of a snap clip device 38. The male component of clip device 38' is located on mirror assembly 32; whereas, the female component of clip device 38" is located on module 22 and faces downward. As a result, to releasably affix mirror assembly 32 to module 22, the male component 38' simply inserts into the female component 38". In one or more alternative embodiments, mirror assembly 32 can releasably affixed to a metallic embodiment of module 22 or metallic embodiment of ceiling 12 (or metallic plate affixed to either) by means of a magnet (see FIG. 3).

Figure 3:
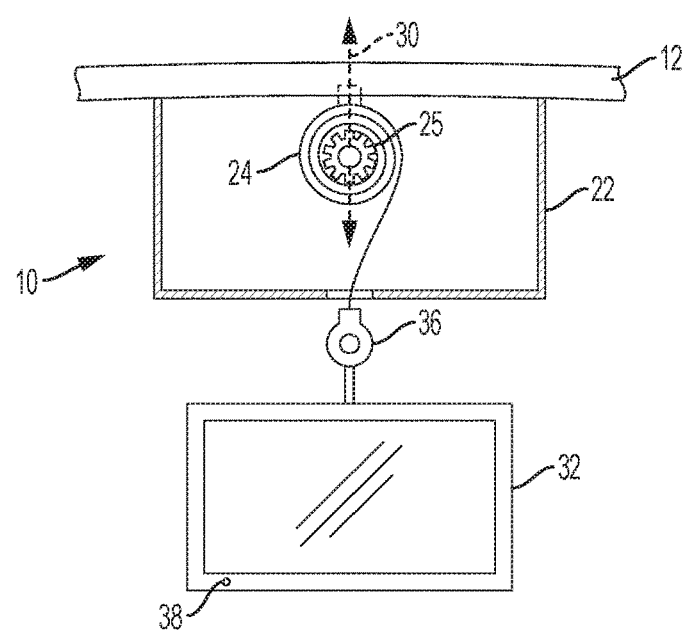
FIG. 3 shows a side view of the exemplary mirror system according to another aspect of the present disclosure.

As shown in FIG. 3, an interior occupant may extend mirror assembly 32 downwardly from module 22 or ceiling 12 through a pulling action. Once pulled down to a proper location, the retractor assembly 24 can lock the connector 26 in place and mirror assembly 32 in an extended position. For example, as shown, a first extended position may provide enough room for mirror assembly 32 to pivot downward and into the vertical orientation (as shown), or a tilted orientation being at a tilted angle (see FIG. 4), and allow for its usage. When pulled to this first extended position, mirror assembly 32 may be rotated around the vertical axis 30 by means of rotator assembly 24 to enable each interior occupant usage of the mirror, especially when seated in the round table orientation.

Figure 4:
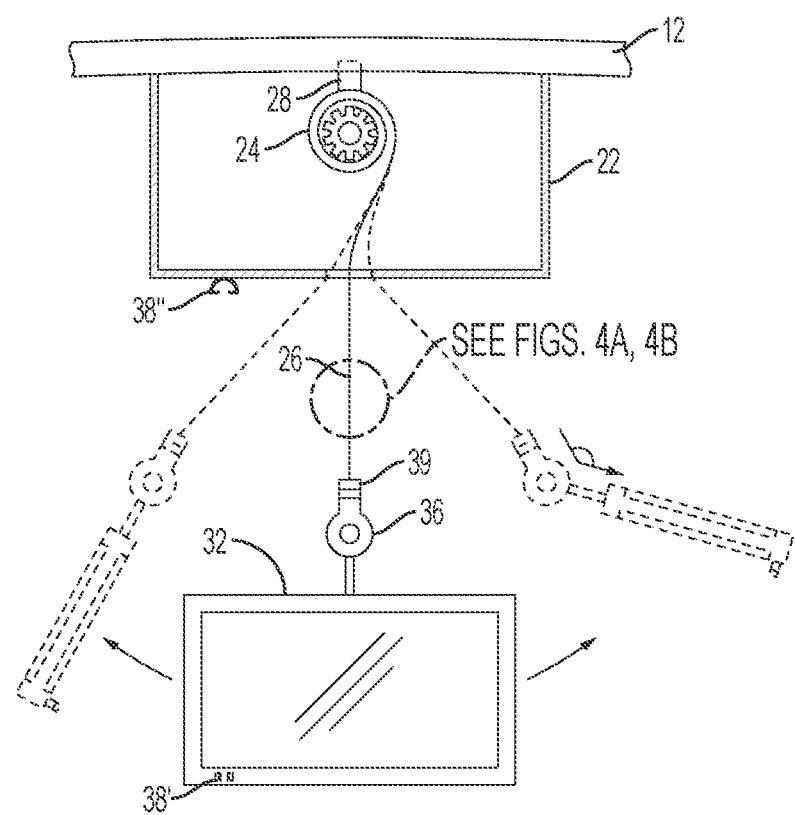
FIG. 4 shows a side view of the exemplary mirror system according to another aspect of the present disclosure.
Figure 4A:
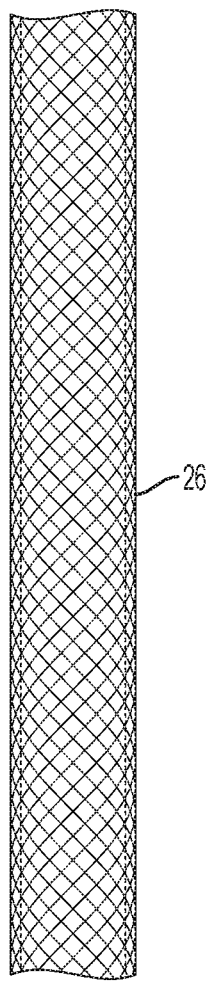
FIG. 4A shows an exemplary connector feature of the exemplary mirror system of FIG. 4.
Figure 4B:
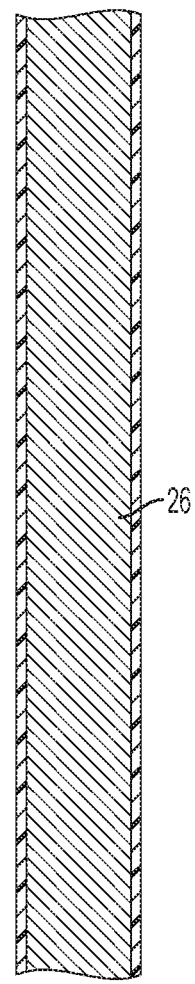
FIG. 4B shows another exemplary connector feature of the exemplary mirror system of FIG. 4.

As shown in FIG. 4, pulling down on mirror assembly 32 after it is already in the first extended position will place it in a second extended position. This second extended position allows for interior occupants to bring the mirror up close to their person while seated. Moreover, to retract the mirror assembly 32 to its default retracted position (see FIG. 2), an interior occupant is simply required to give a quick jerk when in the second extended position and retractor assembly 24 will retract connector 26 by causing it to be wound back around spool 25. In certain embodiments, for more freedom of use, the interior user may also disconnect mirror assembly 32 from connector 26 via a detachment device 39. The detachment device 39 may simply be two threaded elements that screw together connector 26 and mirror assembly 32 or a snap clip which releasably connects these features. With reference to FIG. 4A, connector 26 may be embodied as a strip of webbing, for example, made from canvas. Connector 26 may alternatively be embodied as a steel cord, for example, having a plastic coating, referring to FIG. 4B. It should be understood mirror assembly 32 may include mirrors on both sides (i.e., two sided) or on one side (i.e., one sided). A two-sided embodiment of mirror assembly 32 is shown in FIG. 4.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A mirror system comprising:
    a retractor module configured to be installed onto the ceiling of a vehicle interior;
    a retractor assembly positioned within the retractor module, the retractor assembly having a retractable connector attached at one end to a mirror positioned outside of the retractor module, the retractor assembly configured to releasably maintain the connector in a retracted position and at least one extended position; and
    the mirror being pivotably connected to the connector around a horizontal axis such that the mirror can be in a substantially horizontal orientation or substantially vertical orientation.

2. The mirror system of claim 1, wherein, when in the substantially horizontal orientation, the mirror can releasably affix to the exterior of the retractor module via a snap clip.

3. The mirror system of claim 1, wherein, when in the substantially horizontal orientation, the mirror can releasably affix to the exterior of the retractor module via a magnet.

4. The mirror system of claim 1, wherein the retractor assembly is rotatably positioned within the retractor module such that the mirror can rotate 360 degrees around a vertical axis.

5. The mirror system of claim 1, wherein the vehicle interior is located in an autonomous vehicle and has by two rows of vehicle seats, wherein each vehicle seat row can face the other vehicle seat row.

6. The mirror system of claim 1, wherein the retractable connector is a strip of fabric webbing.

7. The mirror system of claim 1, wherein the mirror is pivotably connected to the connector via an axle hinge.

8. The mirror system of claim 1, wherein the mirror is a two-sided mirror.

9. A vehicle interior comprising:
    a retractor assembly affixed to the ceiling of the vehicle interior, the retractor assembly having a retractable connector attached at one end to a mirror, the retractor assembly configured to releasably maintain the connector in a retracted position and at least one extended position; and
    the mirror being pivotably connected to the connector around a horizontal axis such that the mirror can be in a substantially horizontal orientation and substantially vertical orientation.

10. The vehicle interior of claim 9, wherein, when in the substantially horizontal orientation, the mirror can releasably affix to the ceiling of the vehicle interior via a snap clip.

11. The vehicle interior of claim 9, wherein, when in the substantially horizontal orientation, the mirror can releasably affix to the ceiling of the vehicle interior via a magnet.

12. The vehicle interior of claim 9, wherein the retractor assembly is rotatably affixed ceiling of the vehicle interior such that the mirror can rotate 360 degrees around a vertical axis.

13. The vehicle interior of claim 9, wherein the vehicle interior in located in an autonomous vehicle and comprises two rows of vehicle seats, wherein each vehicle seat row can face the other vehicle seat row.

14. The vehicle interior of claim 9, wherein the retractable connector is a strip of fabric webbing.

15. The vehicle interior of claim 9, wherein the retractable connector is a steel cord.

16. The vehicle interior of claim 9, wherein the mirror is pivotably connected to the connector via an axle hinge.

17. The vehicle interior of claim 9, wherein the mirror is a two-sided mirror.

18. An autonomous vehicle interior comprising:
    two rows of vehicle seats, wherein each vehicle seat can face towards a central location in the vehicle interior;
    a retractor assembly rotatably affixed to the vehicle interior ceiling and at a ceiling location generally centered between the vehicle seats, the retractor assembly having a retractable connector attached at one end to a two-sided mirror, the retractor assembly configured to releasably maintain the connector in a retracted position and at least one extended position; and the mirror being rotatably connected to the connector around a horizontal axis via an axle hinge such that the mirror can be in one of a substantially horizontal orientation, tilted orientation, or substantially vertical orientation, wherein, when in the substantially horizontal orientation, the mirror can releasably affix to the ceiling of the vehicle interior via a snap clip and, when in the tilted orientation or substantially vertical orientation, the mirror can rotate 360 degrees around a vertical axis via the retractor assembly.

19. The autonomous vehicle interior of claim 18, wherein the mirror is detachable from the connector.

20. The autonomous vehicle interior of claim 18, wherein the retractable connector is a steel cord.

* * * * *